C. B. DALZELL.
MILKING MACHINE.
APPLICATION FILED DEC. 8, 1915.
1,218,529.
Patented Mar. 6, 1917.
3 SHEETS—SHEET 1.
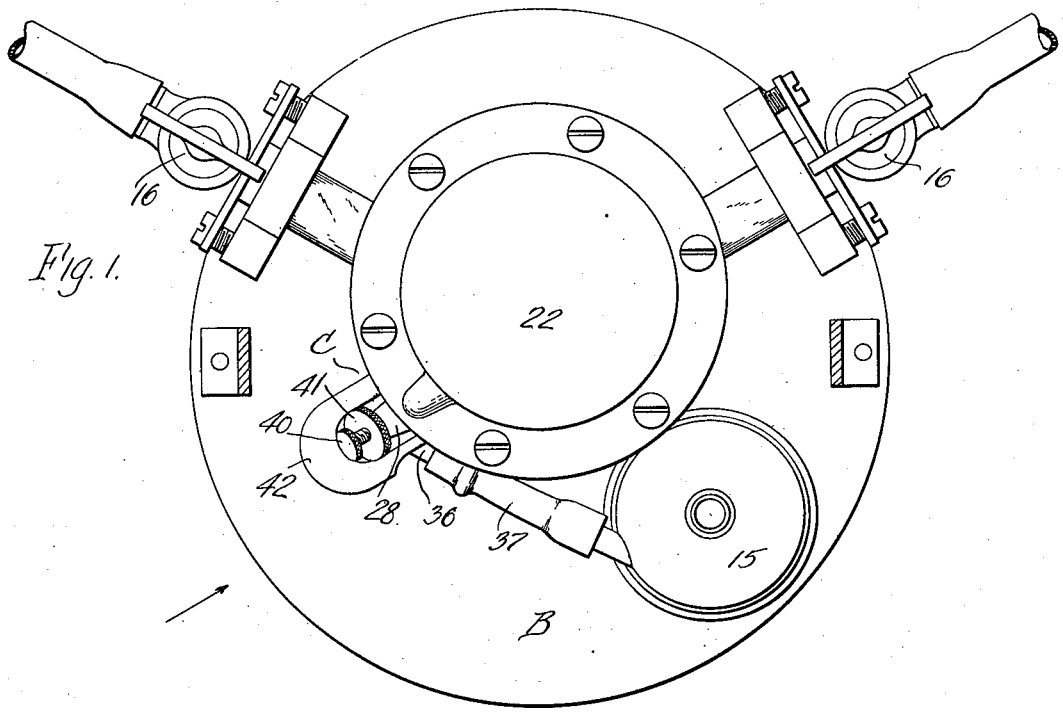
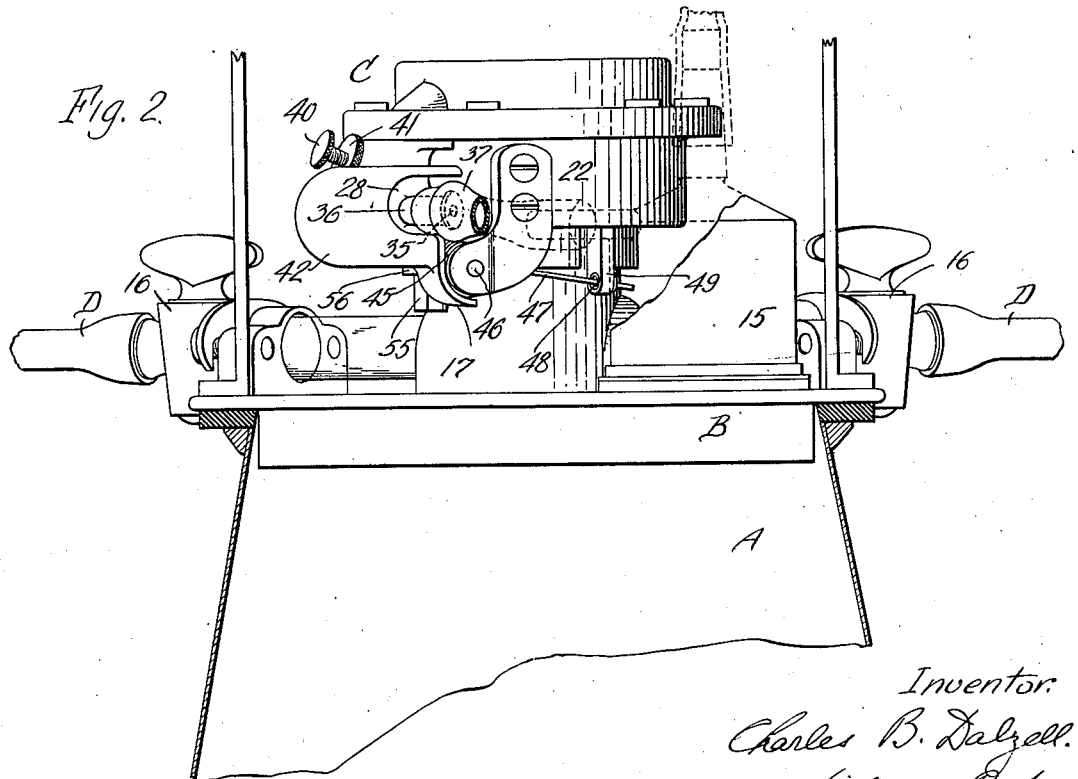
Inventor:
Charles B. Dalzell.
By Wilhelm & Parker,
Attorneys

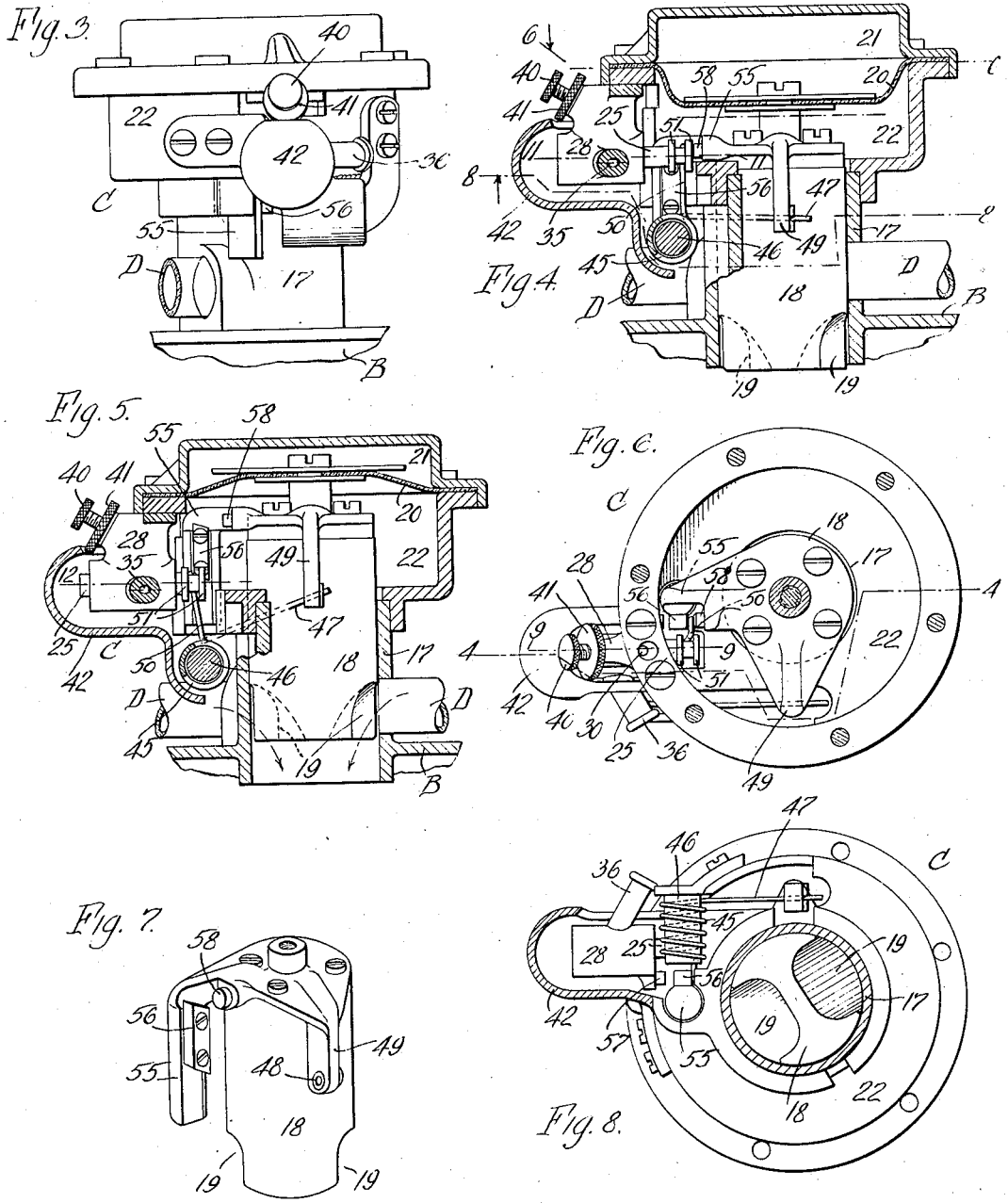

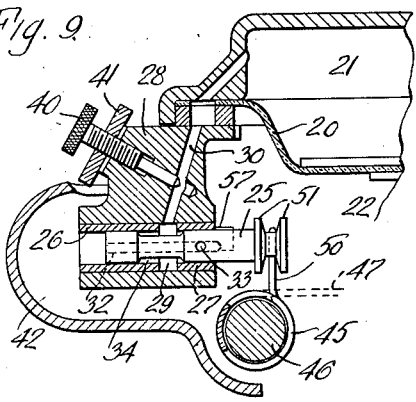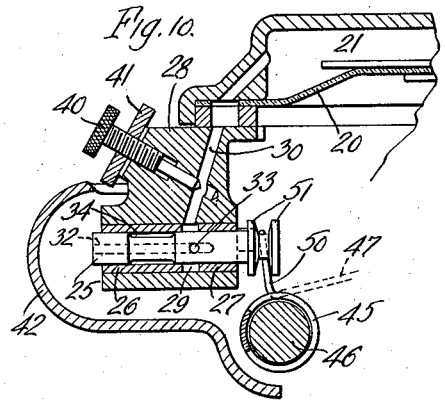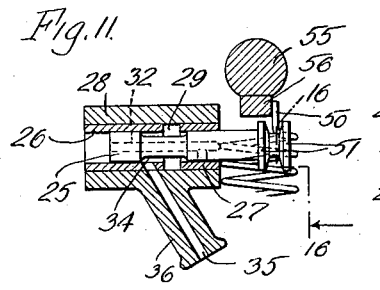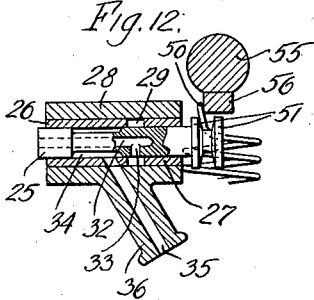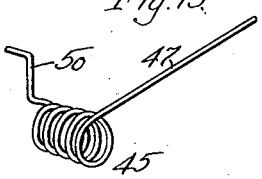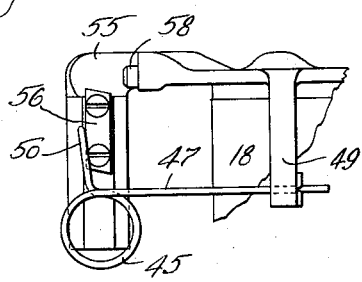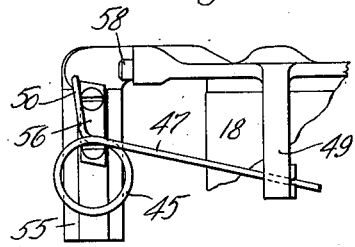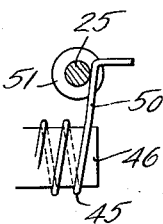

UNITED STATES PATENT OFFICE.

CHARLES B. DALZELL, OF LITTLE FALLS, NEW YORK, ASSIGNOR TO D. H. BURRELL & COMPANY, OF LITTLE FALLS, NEW YORK.

MILKING-MACHINE.

1,218,529.  Specification of Letters Patent.  Patented Mar. 6, 1917.

Application filed December 8, 1915. Serial No. 65,692.

*To all whom it may concern:*

Be it known that I, CHARLES B. DALZELL, a citizen of the United States, residing at Little Falls, in the county of Herkimer and State of New York, have invented a new and useful Improvement in Milking-Machines, of which the following is a specification.

This invention relates to milking machines of the kind in which suction is applied to the teat cups intermittently or in pulsations by means of a pulsator mechanism which alternately connects the teat cups with and disconnects them from the suction means. The invention relates more particularly to improvements in the pulsator mechanism and in the means for controlling the operation thereof.

The objects of the invention are to provide a pulsator mechanism with means of improved, simplified and durable construction which will insure positive and accurate operation of the pulsator mechanism and which reduces to the minimum the number of movable parts and joints that are apt to wear and cause variation in the action of the pulsating mechanism; and also to construct and arrange the parts of the pulsator mechanism so that it is possible to readily clean and sterilize the same, and to accomplish this in a manner which at the same time greatly simplifies the mechanism.

In the accompanying drawings:

Figure 1 is a top plan view of the cover of a milk pail having pulsator mechanism embodying the invention mounted thereon.

Fig. 2 is a side elevation thereof showing the top of the milk pail in section.

Fig. 3 is a side elevation of the pulsator mechanism, taken in the direction of the arrow in Fig. 1.

Figs. 4 and 5 are sectional elevations on line 4—4, Fig. 6, respectively, showing the piston at opposite ends of its movement.

Fig. 6 is a top plan view of the pulsator mechanism, partly in section, on line 6—6, Fig. 4.

Fig. 7 is a perspective view of the piston valve detached from the pulsator mechanism.

Fig. 8 is a bottom plan view, partly in section, on line 8—8, Fig. 4.

Figs. 9 and 10 are fragmentary sectional elevations on an enlarged scale, on line 9—9, Fig. 6, showing the reversing valve in different positions.

Figs. 11 and 12 are sectional plan views on lines 11—11, Fig. 4, and 12—12, Fig. 5, respectively.

Fig. 13 is a perspective view of the valve actuating spring.

Figs. 14 and 15 are fragmentary elevations showing different positions of the piston valve and spring.

Fig. 16 is a sectional elevation on line 16—16, Fig. 11.

A represents a milk pail and B a pulsator base or cover therefor which is constructed to form an air-tight closure for the pail. A pulsator mechanism C mounted on the pulsator base B, is adapted to alternately connect milk tubes or passages D, of which two are shown in the construction illustrated, with and disconnect them from the interior of the pail, from which air is exhausted by a pump or other suitable means (not shown) connected with a nipple 15 also mounted on the base B. 16 represents cocks in the milk tubes by means of which the milk tubes can be shut off from the suction.

The pulsator is constructed as follows:

17 represents a cylinder or valve casing which extends upwardly from the pulsator base B and in which the milk passages D terminate. A piston valve 18, arranged to reciprocate in the cylinder 17, closes the milk passages when at the lower part of its stroke and opens the passages to the milk pail when at the upper part of the stroke. The piston valve is provided at its lower end with recesses 19 into which the milk enters from the milk passages when the valve is in its upper position and in which the milk is deflected downwardly into the pail. The upper end of the piston valve is secured to a flexible diaphragm 20 which forms the bottom of a diaphragm chamber 21 which is mounted on a casing 22 supported on the cylinder 17. The casing 22 is open to the atmosphere below the diaphragm so that atmospheric pressure acts upon the upper end of the piston valve and the lower side of the diaphragm. The lower end of the piston valve is acted upon by the partial vacuum in the pail which causes the piston valve to move downwardly when the air is admitted to the diaphragm chamber 21. When the chamber 21 is subjected to the same suction which acts on the lower side of the piston valve, the piston valve will move upwardly since the area of the diaphragm is greater than that of the piston valve. A valve of other construction for controlling the opening and closing of the milk passages may be employed if desired.

The diaphragm chamber 21 above the diaphragm 20 is alternately placed into communication with the suction and with the external air by a reversing valve 25 which is supported by the casing 22, above the pulsator base B and the milk passages D, so that the pulsator base can be immersed in an antiseptic solution to a point above the milk passages for sterilizing the same without immersing the valve and permitting the liquid to enter the air passages of the valve. The reversing valve may be of any suitable construction, that shown being constructed as follows:

The valve 25, see Figs. 9–12, is tubular and is arranged to slide endwise in bushings 26 and 27 secured in a valve housing 28, suitably mounted on the casing 22 of the pulsator. The adjacent ends of the bushings 26 and 27 are spaced apart, thus forming an annular space or groove 29 in the housing around the valve, and a passage 30 connects the groove 29 with the diaphragm chamber 21 above the diaphragm. The valve 25 has a longitudinal passage 32 extending to the end thereof and a transverse passage 33 connecting with the longitudinal passage. The valve also has an external annular groove 34 between its ends. The housing of the valve also has a passage 35 extending through the bushing 26 and connected with the suction, as by terminating the passage in a nipple 36 which is connected by a tube 37 with the nipple 15 with which the suction pump connects. When the valve 25 is in the position shown in Figs. 9 and 11, the groove 34 of the valve connects the suction passage 35 with the groove 29 and the passage 30, so that a partial vacuum is formed in the diaphragm chamber 21. When the valve is in the position shown in Figs. 10 and 12, the passages 32 and 33 of the valve connect with the groove 29, thus permitting external air to pass through the valve passages to the groove 29 and passage 30 and thus break the suction in the diaphragm chamber. 40 represents a regulating valve adapted to be adjusted to obstruct more or less the flow of air through the passage 30, and 41 represents a lock nut for holding the valve in the desired position. The reversing valve and its parts are preferably protected against injury by means of a shield 42 secured on the casing 22.

The reversing valve 25 is moved periodically from one position to the other and its movements are controlled by the piston valve through the medium of a spring 45 and an escapement mechanism, which are preferably constructed as follows:

The spring 45 is coiled around a supporting stud 46 secured in the casing 22, with one end or arm 47 of the spring engaging loosely in a hole 48 in an arm 49 fixed on the piston valve, and the other end or arm 50 of the spring engaging the valve 25, the valve in the construction shown being provided with two shoulders 51, 51, between which the end 50 extends. The downward movement of the piston valve causes the spring 45 to contract about the stud 46 and to move the reversing valve 25 to the right in Figs. 9–12, and the upward movement of the piston valve causes the spring to expand and to move the reversing valve in the opposite direction.

The piston valve has a fixed arm 55 on which a pallet or escapement plate 56 is mounted. The end of the arm 50 of the spring is so arranged relatively to the pallet 56 that the end of the spring will engage one side of the pallet when the valve 25 is in one of its operative positions, and will be held by the pallet against movement until the pallet moves out of engagement with the spring, whereupon the energy stored up in the spring will cause the spring to move the reversing valve quickly into its other position. On the reverse movement of the piston valve, the end of the arm 50 of the spring will engage the other side of the pallet while energy is being stored in the spring in the reverse direction, and when the pallet moves out of engagement with the spring, the reversing valve will be moved in the opposite direction by the spring. 57 and 58, Figs. 4–8, indicate stops adapted to be engaged by the end 50 of the spring to limit the movements of the reversing valve.

In the operation of the pulsating mechanism, when the reversing valve is in the position shown in Figs. 10 and 12, in which position the upper face of the diaphragm 20 is subjected to atmospheric pressure, the piston valve will be moved downwardly by the suction in the pail and will shut off communication between the pail and the milk tubes D. The downward movement of the piston valve depresses the arm 47 of the spring 45, which tends to move the arm 50 of the spring to the right in Figs. 9 to 12, the movement, however, being prevented by the pallet 56, which engages the end of the arm 50. As the piston valve reaches the lower end of its travel, the pallet moves out of engagement with the spring arm 50 and permits the arm to spring suddenly to the right and move the reversing valve to the right, to the position shown in Figs. 9 and 11. In this position the reversing valve connects the diaphragm chamber 21 with the suction, thus causing the diaphragm to draw the piston valve upwardly against the suction in the pail acting on the lower face of the piston valve, so that the piston valve opens communication between the milk tubes D and the pail. The upward movement of the piston valve lifts the arm 47 of the spring and tends to move the arm 50 thereof and the reversing valve to the left in Figs. 9 to 12, but this movement is likewise opposed by the pallet, which engages the arm 50 of the spring until the piston valve reaches the upper end of its travel, when the pallet moves out of engagement with the arm 50 of the spring, which then springs suddenly to the left and moves the valve back to the position in which air is admitted to the diaphragm chamber.

The pulsator mechanism described is simple in construction and positive and accurate in operation, and insures the piston valve making the full stroke at each reciprocation. The spring which actuates the reversing valve has one end thereof directly engaging said valve and the escapement pallet, and the other end of the spring is directly connected to an arm which is rigid with the piston valve. There are no movable or jointed parts between the spring and the piston and reversing valves. This not only reduces the number of necessary parts in the mechanism but prevents the variation in action of the mechanism which results from wear and lost motion when such movable parts are employed. In the arrangement of the parts described, those parts coming in contact with the milk are all arranged adjacent to the base of the pulsator, and when the base is placed in an antiseptic liquid, all such parts can be immersed in the liquid without making it necessary to admit the liquid into the reversing valve and passages connecting therewith, so that the cleaning of the pulsator is greatly simplified. The diaphragm casing 22 preferably slips over the upper end of the cylinder 17 and is removably seated thereon. This casing together with the piston valve, reversing valve and escapement mechanism, which are all carried thereby, can therefore be readily removed from the cylinder by disconnecting the suction tube 37. When so removed the piston valve is exposed below the casing and can be easily cleaned, and the cylinder and milk passages are rendered accessible for thorough cleaning.

I claim as my invention:

1. In a milking machine, the combination of a milk receptacle from which the air may be partially exhausted, a milk passage leading to said receptacle, a pulsator valve having one end exposed to suction in said receptacle and adapted to reciprocate to interrupt the suction in said passage, means for reciprocating said pulsator valve including a reversing valve, a spring connected with said reversing valve and placed under tension by the movements of the pulsator valve, a pallet mounted on said pulsator valve and holding said spring against movement in either direction until the pulsator valve reaches a predetermined position.

2. In a milking machine, the combination of a pulsator comprising a pulsator valve adapted to reciprocate, a valve controlling the flow of fluid for actuating said pulsator valve, a spring for actuating said controlling valve which is placed under tension by said pulsator valve when moving in either direction, and a pallet mounted on said pulsator valve and engaged by said spring for holding the spring to prevent actuation of said controlling valve until the pallet moves out of engagement with said spring.

3. In a milking machine, the combination of a pulsator valve for interrupting the suction on the teat cups, fluid pressure means for reciprocating said valve including a reversing valve, a spring connected to the pulsator valve and placed under tension by the movements thereof for actuating the reversing valve, and a pallet which reciprocates with the pulsator valve and coöperates directly with said spring for preventing the actuation of said reversing valve until the pulsator valve reaches a predetermined position.

4. In a milking machine, the combination of a pulsator valve for interrupting the suction on the teat cups, fluid pressure means for reciprocating said valve including a reversing valve, a spring having arms connected to said valves and placed under tension by the movements of the pulsator valve for actuating the reversing valve, and a pallet which is fixed to the pulsator valve and engages the arm of the spring connected to the reversing valve for holding said arm from movement until the pallet moves out of engagement therewith.

5. In a milking machine, the combination of a milk receptacle from which the air may be partially exhausted, an upright cylinder mounted thereon, a milk passage leading to said receptacle, a pulsator valve arranged to reciprocate in said cylinder for interrupting the suction in said passage, fluid pressure means for reciprocating said valve including a reversing valve located above said milk passage, a spring connected to said valves and placed under tension by the movements of the pulsator valve for actuating the reversing valve, and a pallet which reciprocates with the pulsator valve and engages said spring for preventing the actuation of the reversing valve until the pallet moves out of engagement with the spring.

6. In a milking machine, the combination of a milk receptacle from which the air may be partially exhausted, an upright open-ended cylinder mounted on said receptacle and communicating at its lower end therewith, a milk passage connecting with said cylinder, a piston arranged to reciprocate in said cylinder, for interrupting the suction in said passage, fluid-pressure-actuated operating means for said piston removably mounted on said cylinder, a controlling valve for said piston-operating means connected to said means, said piston-operating means being removable with said piston and said valve from said cylinder.

7. In a milking machine, the combination of a milk receptacle from which the air may be partially exhausted, an upright open-ended cylinder mounted on said receptacle and communicating at its lower end therewith, a milk passage connecting with said cylinder, a piston arranged to reciprocate in said cylinder for interrupting the suction in said passage, a diaphragm chamber removably mounted on said cylinder and having a diaphragm connected to said piston, and a reversing valve controlling the flow of fluid to and from said diaphragm chamber, said diaphragm chamber being removable with said piston from said cylinder, and said reversing valve being carried by and removable with said diaphragm chamber.

8. In a milking machine, the combination of a milk receptacle from which the air may be partially exhausted, an upright open-ended cylinder mounted on said receptacle and communicating at its lower end therewith, a milk passage connecting with said cylinder, a piston arranged to reciprocate in said cylinder for interrupting the suction in said passage, a diaphragm chamber removably mounted on said cylinder and having a diaphragm connected to said piston, a reversing valve controlling the flow of fluid to and from said diaphragm chamber, and actuating means for said reversing valve connected to said piston, said diaphragm chamber being removable with said piston from said cylinder and said reversing valve and its actuating means being carried by and removable with said diaphragm chamber.

9. In a milking machine, the combination with a milk receptacle from which the air may be partially exhausted, a pulsator base mounted on said receptacle and including a cylinder opening at its lower end into said receptacle, a milk passage connecting with said cylinder, a piston valve having one end exposed to suction in said receptacle and adapted to reciprocate in said cylinder, and fluid pressure operating means for said piston valve including a casing supported on said cylinder, a reversing valve for said piston valve mounted on said casing above said base, a spring which is placed under tension by said piston valve for actuating said reversing valve, and an escapement device for causing the spring to actuate the reversing valve when the piston valve reaches a predetermined position.

10. The combination in a milking machine, of a reciprocatory member adapted to be driven by fluid pressure, a valve for controlling the flow of motive fluid for actuating said reciprocatory member, a spring for actuating said controlling valve which is placed under tension by said reciprocatory member when moving in either direction, and a pallet which receives movement from said reciprocatory member and which is engaged by said spring for holding the spring to prevent actuation of said controlling valve until the pallet moves out of engagement with said spring.

11. The combination in a milking machine, of a reciprocatory member adapted to be driven by fluid pressure, a valve for controlling the flow of motive fluid for actuating said reciprocatory member, a spring for actuating said controlling valve having arms connected to said reciprocatory member and said controlling valve and adapted to be placed under tension by the movement of said reciprocatory member in either direction, and means movable with said reciprocatory member and engaging said spring for holding the same to prevent actuation of the controlling valve until said means moves out of engagement therewith.

12. The combination in a milking machine, of a reciprocatory member adapted to be driven by fluid pressure, a reversing valve for controlling the flow of motive fluid for actuating said reciprocatory member, a spring for actuating said controlling valve and which is placed under tension by said reciprocatory member, and means secured to said reciprocatory member and engaged by said spring for holding the spring to prevent actuation of said controlling valve until said means moves out of engagement with said spring.

Witness my hand, this 6th day of December, 1915.

CHARLES B. DALZELL.

Witnesses:
JOHN McDONALD,
H. C. MILLER.